United States Patent
McGrew et al.

(10) Patent No.: US 8,539,247 B2
(45) Date of Patent: Sep. 17, 2013

(54) PASSWORD CHECKING

(75) Inventors: David A. McGrew, Poolesville, MD (US); Andrew D. Persaud, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 301 days.

(21) Appl. No.: 12/821,082

(22) Filed: Jun. 22, 2010

(65) Prior Publication Data

US 2011/0314294 A1 Dec. 22, 2011

(51) Int. Cl.
*G06F 21/00* (2013.01)
(52) U.S. Cl.
USPC ........................................ 713/183; 713/182
(58) Field of Classification Search
USPC ................................................ 713/182, 183
See application file for complete search history.

(56) References Cited

U.S. PATENT DOCUMENTS

| | | | | |
|---|---|---|---|---|
| 5,394,471 | A * | 2/1995 | Ganesan et al. | 713/183 |
| 2008/0307235 | A1 * | 12/2008 | Keohane et al. | 713/183 |
| 2010/0114560 | A1 | 5/2010 | Spataro | |
| 2011/0239267 | A1 * | 9/2011 | Lyne et al. | 726/1 |

OTHER PUBLICATIONS

Asymptotic Behavior of the Lempel-Ziv Parsing Scheme and Digital Search Trees Philippe Jaquet, Wojciech Szpankowski Revised Nov. 1994.*
On Lempel-Ziv Complexity of Sequences Ali Doğanaksoy, Faruk Gölogu 2006.*
The Development of a Perl-based Password Complexity Filter © 2008 SYS-CON Media.*
High performance Lempel-Ziv compression using optimized longest string parsing and adaptive Huffman window size Data Compression Conference, 2000. Proceedings. DCC 2000.*
Technical Report #93-10 Data compression optimizations for the Lempel-Ziv-Huffman algorithm by Artyom Shaposhnikov 1993.*
Secure Passwords Keep You Safer by Bruce Schneier Wired News Jan. 15, 2007.*
European Patent Office, "Search Report and the Written Opinion ", International application No. PCT/US11/29677 dated Jun. 1, 2011, 9 pages, Applicant: Cisco Systems Inc.
Current Claims of PCT application No. PCT/US11/29677 dated Jun. 2011, 4 pages, Applicant: Cisco Systems Inc.
Weir, M. et al., "Password Cracking Using Probabilistic Context-Free Grammars" 2009 IEEE, 16 pages.
Yan, J., "A Note on Proactive Password Checking" XP008120131 dated Sep. 10, 2001, 10 pages.
Dhillon, H., "Second Order Markov Model Based Proactive Password Checker" downloaded from the Internet on Aug. 25, 2010 < http://www.openwall.com/lists/john-users/2007/09/15/2 > (2 pages).
Marechal, S., "Openwall Project" downloaded from the Internet on Aug. 25, 2010 < http://www.iitg.ernet.in/nselvaraju/ma402_2007/Assignments/04010214_tp.pdf > (2 pages).
Narayanan, A. et. al., "Fast Dictionary Attacks on Passwords Using TimeSpace Tradeoff" *CCS'05 Copyright 2005 ACM* (Nov. 7-11, 2005) 9 pages.

* cited by examiner

*Primary Examiner* — Kambiz Zand
*Assistant Examiner* — Benjamin Kaplan
(74) *Attorney, Agent, or Firm* — Hickman Palermo Truong Becker Bingham Wong LLP

(57) ABSTRACT

A method is disclosed for password checking. After input is received, a proposed password included in the input is parsed into symbols. At least one of the symbols includes two or more characters. A probably metric is determined based on a sequence of symbols. The probability metric is used to determine whether or not the password is secure.

20 Claims, 3 Drawing Sheets

PASSWORD CHECKING

TECHNICAL FIELD

The present disclosure generally relates to checking the security quality of passwords for computing systems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Passwords are widely used to secure computing systems, networks, and other secure environments. A password is often a string of characters that is used as a secret within a cryptographic protocol or a security system. When a password includes the space character, it is sometimes called a passphrase. Passwords are often generated by human users, who are then expected to remember the passwords for future access to secure systems.

People are notoriously bad at generating unpredictable passwords. Typically, users select easy to remember passwords such as English words or names of people, pets and places. These passwords are easily guessable by an attacker and are considered weak. A password checker is function that a security system can use to reject guessable passwords before the system accepts them for use.

Passwords may be checked for a minimum number of letters mixed with capitals, number and symbols. This method is not effective for detecting weak passwords derived from a dictionary, and will not meet the unpredictability requirements of prudent security policies. Other methods include checking the password against a dictionary. This method requires a large amount to memory for storing the dictionary.

DETAILED DESCRIPTION

Figure 1:
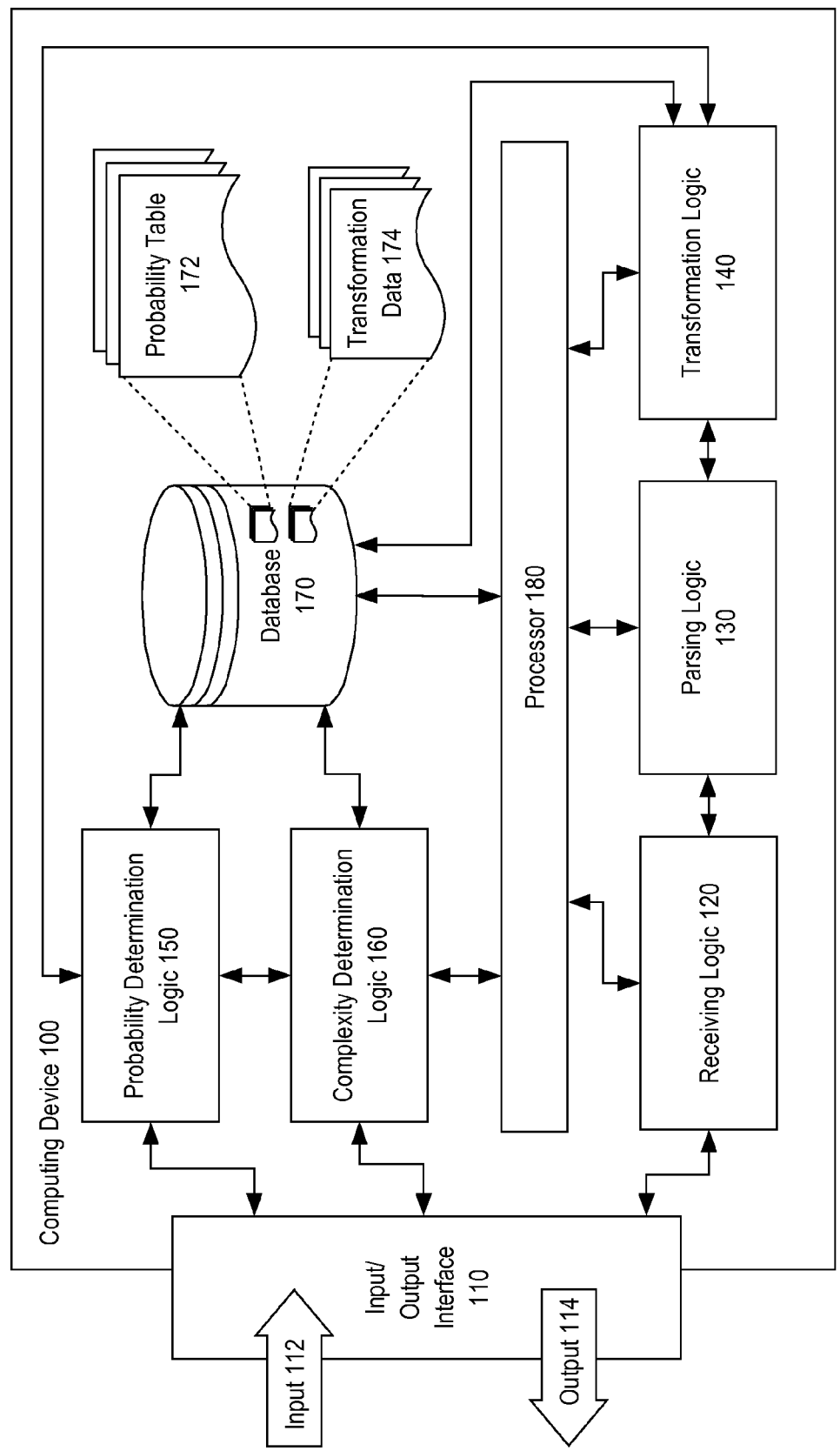
FIG. 1 illustrates a logical block diagram of a computing device on which an embodiment may be implemented.

Password checking is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Password Checking
  3.1 Password Sources
  3.2 Symbols and Probabilities
  3.3 Transformations
  3.4 Optimization Techniques
  3.5 Method for Password Checking
4.0 Implementation Mechanisms—Hardware Overview
5.0 Extensions and Alternatives 1.0 General Overview Password checking is described. In an embodiment, a request having a proposed password is received by a computing device. The proposed password is parsed into a set of two or more symbols. A first symbol includes one or more characters. A second symbol includes two or more characters. Based at least in part on a sequence of the first and second symbols, a first probability metric is determined. Based on the first probability metric, a determination is made as to whether the proposed password is secure.

In an embodiment, the first probability metric measures a likelihood that the second symbol will follow the first symbol. The first probability metric may also measure a likelihood that the first symbol will follow the second symbol. The probability metric measurement is based on a data source of passwords.

In another embodiment, a second probability metric is determined based at least in part on the sequence of the first and second symbols. The first probability metric is based on a first data source and the second probability metric is based on a second data source. A determination is made as to whether the proposed password is secure based at least in part on the second probability metric.

In another embodiment, a complexity metric is determined for the proposed password. Based at least in part on the complexity metric, a determination is made as to whether the proposed password is secure. In an embodiment, the complexity metric is determined in part by performing a Lempel-Ziv complexity check.

In another embodiment, one or more character transformations are applied to the password. The password comprises a plurality of characters. Applying a character transformation includes substituting a first character of the plurality of characters with a second character that is different than the first character.

In another embodiment, there is a third symbol that has one or more characters. Based on a sequence of the second and third symbols, a second probability metric is determined. Based on the second probability metric, a determination is made as to whether the proposed password is secure. The second probability metric may be based at least in part on the first symbol in an embodiment. In an embodiment, the request is a request to set or change a password.

In other embodiments, the invention encompasses a computer apparatus and a computer-readable medium configured to carry out the foregoing steps.

2.0 Structural and Functional Overview

FIG. 1 is a block diagram illustrating a computing system 100 on which an embodiment may be implemented. Computing system 100 includes input/output (I/O) interface 110. I/O interface 110 may be configured to couple to a network, user input device, or other device or means of providing signals or data as input 110. I/O interface 110 may also be configured to couple to a network, output display device, or transmission media device capable of transmitting or displaying output 114.

Input signals or data 112 may include a password. For example, input 112 may include a request to change a password on computing system 100 or another computing system, and the request may include the new password for the system proposed by a user or device requesting the change. Output 114 may include a response to a user, indicating success or failure of a request, such as a request to set or change a password. Other output may include network management messages sent to network management software.

Computing system 100 includes receiving logic 120 configured to receive input 112 from I/O interface 110. Receiving logic 120 may be configured to store input 112 or information associated with input 112 in non-transitory media, such as volatile or non-volatile storage media. For example, receiving logic 120 may include logging logic. Receiving logic 120 may also be configured to perform password checking functions that do not require parsing by parsing logic 130. For example, standalone rules and regular expression password checks may be implemented by receiving logic 120. In other embodiments, such password checking may be performed by other elements of computing system 100, such as elements 130, 140, 150, 160.

Receiving logic 120 is communicatively coupled to I/O interface 110, processor 180, and parsing logic 130 in the embodiment shown in FIG. 1. In other embodiments, additional elements of computer system 100 may be coupled to receiving logic 120. In addition, elements not shown in FIG. 1 may be added in other embodiments, and the configuration of elements of the computing system may differ from the configuration shown in FIG. 1. For example, receiving logic 120 may be incorporated into parsing logic 130, and database 170 may be remotely connected to computing system 100. Processor 180 may comprise hardware logic in the form of one or more central processing units (CPUs) each having one or more cores.

In the embodiment of FIG. 1, parsing logic 130 is communicatively coupled to receiving logic 120, processor 180, and transformation logic 140. In an embodiment, parsing logic may also be communicatively coupled to probability determination logic 150 or complexity determination logic 160. Parsing logic may also be communicatively coupled to database 170 in order to alter parsing strategy based on probability table 172. Parsing logic is configured to parse input data included in input 112, such as a proposed password. For example, parsing logic may parse a password into a set of symbols, where each symbol is a string of one or more characters.

Transformation logic 140 is communicatively coupled to parsing logic 130, database 170, processor 180, and probability determination logic 150. Transformation logic 140 performs transformation operations on signals or data included in input 112, such as a proposed password. A transformation operation may cause signals or data representing one character of a password or symbol to be replaced by another character. As one example of a transformation operation, the number "0" may be replaced by the letter "o" for purposes of determining whether a password is acceptable. Transformation operations may be performed before parsing takes place, and may also be performed on individual symbols or portions of symbols that result from a parsing operation performed by parsing logic 130. Transformation operations may be based on transformation data 174 stored in database 170. In an embodiment, transformation data may be stored in any other location that is accessible to transformation logic via I/O interface 110. For example, transformation data 174 and other data in database 170 such as probability table 172 may be stored in main memory coupled to processor 180, on a remote storage device or flash memory.

Probability determination logic 150 is communicatively coupled to database 170, transformation logic 140, and complexity determination logic 160. Probability determination logic 150 is configured to use probability table 172 to determine probabilities associated with the password and symbols derived from the password. For example, the probability that one symbol will follow another symbol, given a particular data source, may be determined by probability determination logic 150. One or more probability metrics may be generated by the probability determination logic. Probability table 172 is based on data from one or more data sources that include passwords (not shown), such as probability information about the passwords. More than one probability table 172 may be included in database 170, and a data source of passwords need not be included in or accessible to computer system 100 if probability table 172 is available.

Complexity determination logic 160 is configured to determine a complexity metric associated with a password. For example, a Lempel-Ziv complexity operation may be performed on the password by complexity determination logic 160 to generate a complexity metric that describes the overall complexity of the password.

Probability determination logic 150 and complexity determination logic 160 are each coupled to I/O interface 110, and may each provide output. Output may be data or signals associated with the password. For example, probability determination logic 150 or complexity determination logic 160 may reject or accept a proposed password, and then generate output communicating such a result to a user or system. In addition, probability determination logic 150 and complexity determination logic 160 are each coupled to processor 180, and are capable of performing system changes, such as changing a password on computing system 100.

3.0 Password Checking 3.1 Password Sources

A password "source" is a data source for, or used to form, passwords. Password sources often include many words or phrases that may be used as passwords. Adversaries may use these sources when trying to guess the correct password for a secure system, trying each password in the source. A complete dictionary of words for a particular language is one example of a password source. Sources may also include lists of names, words that are plurals or that have been conjugated. Phrases that are derived from two languages may be used. Some sources may include dictionary words with common character transformations, such as a dictionary based on "1337," which is a method of writing that is based on transformations of letters in the English language. For example, the letter "e" is often substituted for the number "3" to satisfy a number requirement for a less sophisticated password checker. Other known sequences of characters may be part of a data source. For example, the string of characters "qwerty" is common because of the proximity of each character in the string to one another on many computer keyboards. Other known sequences of characters may also be stored in a data source, such as license plate numbers, social security numbers, telephone numbers, and house numbers. A password source can come from any known data set, and may even be generated. For example, a password generator may use a random character generator to create a list of acceptable passwords.

Password sources that are used for password guessing may also be used for password checking. For example, a user may initiate a request to set or change a password. The system may, in response to the request, attempt to match the proposed new password with a password in one or more known password sources. If the proposed password string matches a name in a data source that includes common names, such as "John," the password checking mechanism will reject the password. This list may then be used as a data source.

3.2 Symbols and Probabilities

Traditional mechanisms for matching strings such as proposed passwords require access to the data source to which the string is compared. For example, if a password checking mechanism's primary means of determining whether or not a proposed password is acceptable is to compare the password against three data sources, such as dictionaries, those three data sources would need to be available for comparison with the password. If the proposed password is found in one of the data sources, the password is rejected. This method requires a large amount of to memory to store each dictionary or data source. For this and other reasons, this method is not feasible on many devices, such as routers and switches.

In an embodiment, a more compact and efficient method of checking passwords using a computer may be achieved by estimating a probability of the password based on the likelihood of character substrings. By storing probability tables, such as probability table 172 instead of the entire data source, a large exclusion set may be realized using less data storage than past approaches. The data set may be used to generate probability tables, and then the data set is no longer needed. A particular probability table may then be used to reject the most probable passwords from the source from which the particular probability table is derived without requiring direct access to the source.

In an embodiment, individual probabilities are determined for character transitions within a string, such as a proposed password. The individual probabilities are used to generate a probability metric associated with the password. If the probability metric exceeds a predefined threshold, then the likelihood that a password may be guessed by an adversary based on a data source may be considered too great. One or more responsive actions may be taken, such as informing the user proposing the password to generate a more secure password.

Any given data set may be used to generate probability tables, and each probability table may be given different weight, based on administrator preference. For example, a particular dictionary may include words that are less commonly used in password creation and guessing than words in the English language dictionary.

In an embodiment, for a particular data set, a probability is determined for each possible character occurring at a particular location in a string of characters, depending on one or more previous characters in the string. Thus, the probabilities are based at least in part on the transition from one character to another. For example, the probability that the letter "u" will follow the letter "q" in the third position of the string, such as in the word "aqua," may be less likely than the letter "u" falling in the same position when the letter "q" is not in the second position. Initial probabilities may be generated based on the initial data set, and stored in a probability table such as probability table 172. Initial probabilities may indicate the probability that a particular character will occur as the first character in a particular string, given a particular data set.

The initial probabilities, along with the subsequent transition-based probabilities, may be converted into a convenient probability metric by determining a logarithm of each probability and storing the initial and transition-based probability metrics in the table, rather than storing the probabilities. Use of logarithms retains precision and precludes the need for the computing device 100 to perform floating-point operations. For embedded environments or processors that lack the capability to perform floating-point operations, an addition operation may be used to generate an aggregate probability metric for the password as a whole. The individual probability metrics associated with transitions and initial probabilities are added, as adding the log of a number A to the log of a number B is the same as multiplying A and B together, then determining a log of the result. Any probability threshold for determining whether or not the password is secure based on probabilities in this embodiment may be based on the logarithm of the probability that is deemed to be the maximum acceptable probability for a password.

Probabilities for each transition do not need to be stored in an embodiment. For example, particular transitions are so uncommon that the benefits of storing a probability for the transition are outweighed by the space savings gained by not storing the probability. For example, the string "#~" may be very uncommon. Other strings having different probability metrics may also be extremely uncommon. Assigning a default probability value for such strings has benefits. For example, a password checking function searches probability table 172, determines that the transition is not stored, and assigns the default value to the transition. As a result, storage space is reduced, and the uncommon nature of the transitions in question ensures that any skewing of results works in favor of rejecting the password, rather than erroneously accepting a password that should have been rejected.

Common strings may be converted into "symbols" that include one or more characters. Probabilities may then be determined based on the likelihood that a particular symbol will occur at the beginning of a password, or after another particular symbol. This is useful for symbols made up of character strings that occur frequently such as "qu" and "ing."

A character string, such as a password candidate X, can be expressed as a sequence of symbols by choosing an appropriate partition of characters into symbols. For example, the word X=quiet can be partitioned, or parsed, into the symbols $W_1$=qu, $W_2$=ie and $W_3$=t. The partitioning process makes use of a particular set of symbols. A set of symbols of different lengths can better represent a probability distribution than a set of symbols with fixed length, because it can store a character string that occurs frequently, such as "qu," without storing all possible strings with the same length, such as "qa," "qb," and "qc." Therefore, a length of the symbol is variable, allowing for greater flexibility while achieving compactness and efficiency.

A parsing method is denoted as faithful if there is only one possible string of symbols for each possible string of characters. For a complete set of symbols and a faithful parsing method, each character string is associated with exactly one string of symbols. Thus the probability of a character string X, which corresponds to the string of symbols W, can be determined by using a probabilistic model over strings of symbols.

A set of symbols is prefix-free if, for each pair of symbols (a, b) in the set, a is not a prefix of b, and b is not a prefix of a. A prefix-free set of symbols is faithful; there will be only one possible way to parse each character string.

An alternate method to faithful parsing is to use the convention that, during a parsing, the longest matching symbol should be used. A longer symbol that contains a shorter symbol as its prefix must occur with a probability that is no greater than that of the shorter symbol. Thus, choosing the longest possible match during parsing ensures that the probability estimate is lower, and closer to the actual value. This parsing process can be facilitated by storing the set of symbols in a tree structure, in which each parent node is a prefix of all of its sibling nodes. The parsing process then includes traversing the tree from the root to the internal node that provides the longest match, then starting again at the root to match the next longest substring.

In an embodiment, the symbol set and transition probabilities that best represent a password source are built. The password source is analyzed to determine the probability of occurrence of all strings of a particular number N (or fewer) characters, and then include the most likely strings in the symbol set. In one embodiment, the set of strings with length N or less is sorted based on order of decreasing probability, and then the symbol set is constructed as the initial part of the sorted list of strings. Likely transitions between symbols are then stored to assess the probability of a string of symbols.

A model based on likely symbols is used in conjunction storing only the most likely transitions. Since unlikely transitions between symbols are not stored, the amount of data stored is not bounded by the square of the number of symbols. The probability estimate using symbols, where at least one symbol has more than one character, is more accurate than a model over characters. For example, the probability estimates PS and PC of the word "quit" using models over symbols and characters, respectively, in the case that both models represent the same source of candidate passwords, are given by the relations $$PS=P[qu]+P[i|qu]+P[t|i]$$

$$PC=P[q]+P[u|q]+P[i|u]+P[t|i]$$

where "qu" denotes a symbol having a string of two characters, and "q," "u," "i," and "t" denote either characters or one-character symbols. The difference D between PS−PC captures the difference in probability estimates between the models. For the word "quit," the difference in probability estimates is given by the relation $$D=P[i|qu]-P[i|u],$$

because both models represent the same source, and therefore P[qu]=P[q]+P[u|q]. The symbol-based model captures more of the details of the source.

The assessment of a candidate password can be implemented generally as a two-step process. The first step parses the character string into a string of symbols, and the second step assesses the probability of the string of symbols. In practice, these steps need not be kept distinct. In an embodiment a symbol set consisting of all one-character symbols, plus the most probable two-character symbols is used.

A user interface automates the symbol selection process in an embodiment. For an example, a user of computing device 100 may provide, as input, one or more data sources. Based on an analysis of the data sources provided, a determination is made as to which multi-character symbols will be included in a probability table such as probability table 172.

3.3 Transformations

Known substitutions that are commonly used to transform words into passwords may be categorized. In an embodiment, a password check function may require that, for each input password x, the words resulting from the application of each transformation $T_1(x), T_2(x), \ldots, T_u(x)$ should also pass the password checking function. Since the number of transformations u is finite, the password checking function has complexity O(uN). If each transformation acts on no more than one character, the complexity can be reduced.

Transformations may be based on transformation data 174, which may include a table or list of transformation information. Transformation information may include a mapping between a first symbol and a second symbol, where a symbol is a string of one or more characters. In an embodiment, transformation logic 140 accesses transformation data 174 to determine whether a transformation is available for one or more symbols or individual characters that make up a proposed password. If a transformation is available, the symbol or character may be transformed before a probability metric or complexity metric is generated. Symbols of more than one character may be transformed together, or broken into individual characters for purposes of carrying out a transformation.

In other embodiments, transformations may occur before parsing begins at parsing logic 130. For example, the password received by receiving logic may be "C1sc0abc." A transformation for this password may be to convert the number "1" into the letter "i." Likewise, the number "0" may be converted to the letter "o," resulting in the password "Ciscoabc." Such a password is more likely to be rejected by subsequent password checking mechanisms.

Transformations may be performed globally, so that all possible transformations are performed. In other embodiments, only a subset of available transformations may be performed. All possible combinations of transformations may be considered in an effort to determine which transformation creates the password having the highest probability metric. For example, a password such as "C1sc0123" may be transformed into "Ciscoi2e" with a global transformation that considers a 1-to-i transformation and a 3-to-e transformation. But when all possible transformation combinations are considered, the weakest version, "Cisco123" may be chosen, and subsequently rejected based on complexity or probability metrics.

3.4 Optimizations

Complexity tests may be used to detect passwords that may not be included in a data source, but should be rejected because of inherent weakness. For example, the character string "qqqqqqqq" may not exist in a data source used to generate probability tables, and may therefore generate an acceptable probability metric. However, the password is not very complex, as it only consists of one unique character, repeated eight times.

Complexity determination logic may be used to measure the complexity of a finite sequence. A complexity metric may be generated, and compared to a threshold to determine whether or not a password should be rejected. Lempel and Ziv outlined an algorithm that that essentially counts the number of distinct patterns of characters. A Lempel-Ziv (L-Z) test is well suited to detect repetition in candidate passwords. The sequence of 'q's has L-Z complexity metric of one, while a uniformly random password is likely to have L-Z complexity equal to its length. The Lempel-Ziv test has a fairly compact implementation with no additional memory storage.

Regular expressions may also be used to match passwords that should be rejected. Regular expressions allow for complex pattern matching functions to be defined with very little code. This makes regular expressions ideal for implementing narrowly defined improvements to a password checker.

3.5 Example Method for Password Checking

Figure 2:
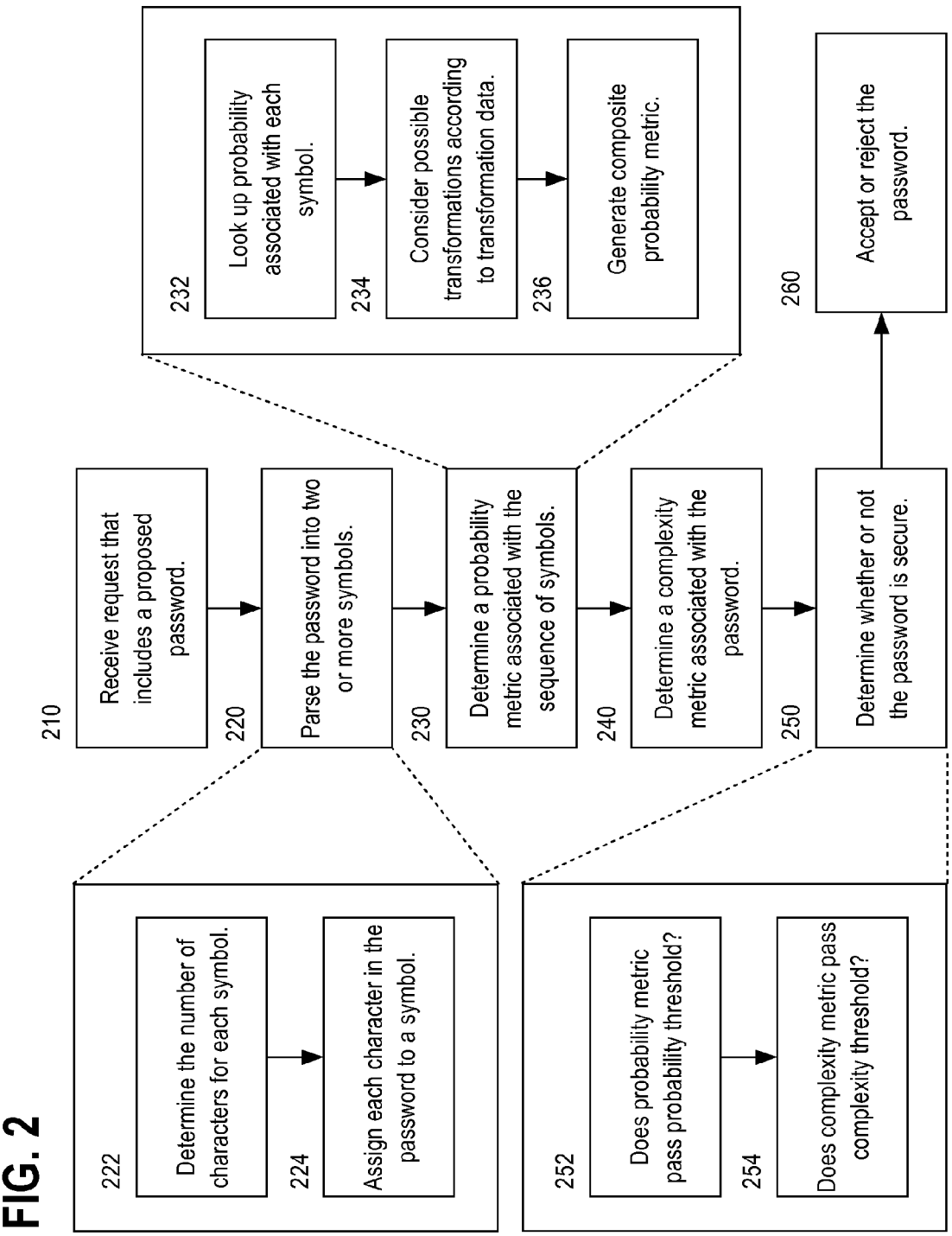
FIG. 2 illustrates a method for password checking in an embodiment.

FIG. 2 illustrates a method for password checking in an embodiment. Steps of FIG. 2 may be implemented in the logical elements of FIG. 1. Additionally or alternatively, steps of FIG. 2 may be implemented in computer program instructions that are stored in volatile or non-volatile storage devices coupled to the computing device 100 of FIG. 1 or coupled to a general-purpose computer system, so that loading and executing the instructions in the general-purpose computer system transforms the system into a special-purpose computer that operates differently, more efficiently and effectively in the manner described herein.

At step 210, a request is received. For example, a request may be represented by input 112, received on IO interface 110 and processed by receiving logic 120. The request includes a proposed password. At step 220, the password is parsed into two or more symbols. For example, parsing may be performed by parsing logic 130. Parsing the password into two or more symbols includes determining the number of characters for each symbol at step 222 and assigning each character in the password to a symbol at step 224. In other embodiments, parsing the password into two or more symbols includes finding the longest possible matching symbol, as discussed in section 3.4.

At step 230, a probability metric associated with the sequence of symbols is determined. This includes steps 232, 234, and 236. At step 232, a probability associated with each symbol is retrieved. Probability logic 150 may perform the probability metric determination based on probability table 172 in an embodiment. At step 234, possible transformations, which may be generated, considered, and implemented by transformation logic 140 are considered based on transformation data 174. At step 236, a composite probability metric is generated. For example, the logarithms of each probability associated with each symbol transition may be stored in probability table 172 as probability metrics. These probability metrics may be combined to generate a composite probability metric for the password. For example, the probability metrics may be added to one another. At step 240, a complexity metric associated with the password is determined. For example, a L-Z complexity check may be performed by complexity determination logic 160.

At step 250, a determination is made as to whether or not the password is secure. This is based on steps 252 and 254 in an embodiment, and may be performed by probability determination logic 150 or complexity determination logic 160. At step 252, the probability metric is compared with a probability threshold. At step 254, the complexity metric is compared with a complexity threshold. At step 260, the password is accepted or rejected, based on the results of step 250. The acceptance or rejection of the password may result in output 114. For example, a user may receive an on-screen indication describing whether the password was accepted or rejected.

4.0 Implementation Mechanisms—Hardware Overview

Figure 3:
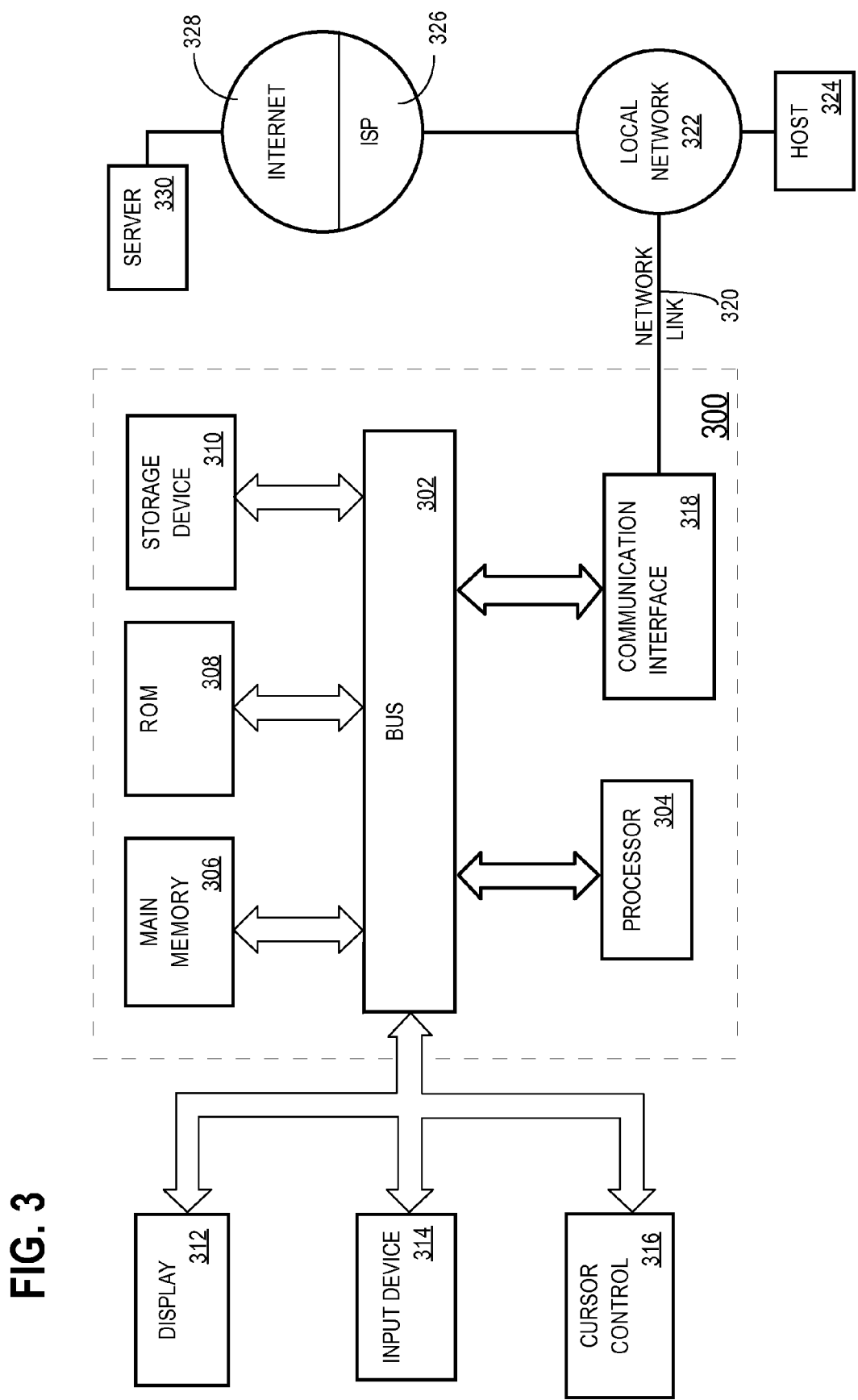
FIG. 3 illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
receiving a proposed password;
parsing the proposed password into two or more symbols, wherein a first symbol of the two or more symbols comprises one or more characters, and a second symbol of the two or more symbols comprises two or more characters;
wherein the parsing the proposed password into two or more symbols comprises determining a number of characters for each symbol, and finding a longest possible matching symbol, from the two or more symbols, that matches a character string, from a plurality of character strings, in a database source;
based at least in part on a sequence of the first and second symbols and the plurality of strings in the database source, determining one or more probabilities and storing in a first probability metric those probabilities from the one or more probabilities that exceed a threshold value and indicate not uncommon character strings;
based at least in part on the first probability metric, determining whether the proposed password is secure;
wherein the method is performed by one or more computing devices.

2. The method of claim 1, wherein the first probability metric measures, based on a data source of passwords, a likelihood that the second symbol will follow the first symbol.

3. The method of claim 1, further comprising:
based at least in part on the sequence of the first and second symbols, determining a second probability metric;
based at least in part on the second probability metric, determining whether the proposed password is secure;
wherein the first probability metric is based on a first data source and the second probability metric is based on a second data source.

4. The method of claim 1, further comprising:
determining a complexity metric for the proposed password;
based at least in part on the complexity metric, determining whether the proposed password is secure.

5. The method of claim 4, wherein determining a complexity metric comprises performing a Lempel-Ziv complexity check.

6. The method of claim 1, further comprising applying one or more character transformations to the password, wherein the password comprises a plurality of characters and applying a character transformation includes substituting a first character of the plurality of characters with a second character that is different than the first character.

7. The method of claim 1, wherein a third symbol of the set of symbols comprises one or more characters; and further comprising:
based at least in part on a sequence of the second and third symbols, determining a second probability metric;
based at least in part on the second probability metric, determining whether the proposed password is secure.

8. The method of claim 7, wherein the second probability metric is based at least in part on the first symbol.

9. The method of claim 1, comprising receiving the proposed password in a request to set or change a password.

10. A computer-readable non-transitory storage medium storing instructions which, when executed, cause one or more processors to perform:
receiving a proposed password;
parsing the proposed password into two or more symbols, wherein a first symbol of the two or more symbols comprises one or more characters, and a second symbol of the two or more symbols comprises two or more characters;
wherein the instructions that cause the parsing the proposed password into two or more symbols further comprise instructions which, when executed, cause determining a number of characters for each symbol, and finding a longest possible matching symbol, from the two or more symbols, that matches a character string, from a plurality of character strings, in a database source;
based at least in part on a sequence of the first and second symbols and the plurality of strings in the database source, determining one or more probabilities and storing in a first probability metric those probabilities from the one or more probabilities that exceed a threshold value and indicate not uncommon characters strings;
based at least in part on the first probability metric, determining whether the proposed password is secure.

11. The computer-readable non-transitory storage medium of claim 10, wherein the first probability metric measures, based on a data source of passwords, a likelihood that the second symbol will follow the first symbol.

12. The computer-readable non-transitory storage medium of claim 10, wherein the instructions further include instructions for:
based at least in part on the sequence of the first and second symbols, determining a second probability metric;
based at least in part on the second probability metric, determining whether the proposed password is secure;
wherein the first probability metric is based on a first data source and the second probability metric is based on a second data source.

13. The computer-readable non-transitory storage medium of claim 10, wherein the instructions further include instructions for:
determining a complexity metric for the proposed password;
based at least in part on the complexity metric, determining whether the proposed password is secure.

14. The computer-readable non-transitory storage medium of claim 13, wherein determining a complexity metric comprises performing a Lempel-Ziv complexity check.

15. The computer-readable non-transitory storage medium of claim 10, wherein the instructions further include instructions for applying one or more character transformations to the password, wherein the password comprises a plurality of characters and applying a character transformation includes substituting a first character of the plurality of characters with a second character that is different than the first character.

16. The computer-readable non-transitory storage medium of claim 10, wherein a third symbol of the set of symbols comprises one or more characters; and wherein the instructions further include instructions for:
based at least in part on a sequence of the second and third symbols, determining a second probability metric;
based at least in part on the second probability metric, determining whether the proposed password is secure.

17. The computer-readable non-transitory storage medium of claim 16, wherein the second probability metric is based at least in part on the first symbol.

18. The computer-readable non-transitory storage medium of claim 10, wherein the instructions further include instructions for receiving the proposed password in a request to set or change a password.

19. The method of claim 1, wherein the database source comprises one or more dictionaries, each of the one or more dictionaries having a weight indicating whether the dictionary comprises words that are less commonly used to create passwords.

20. The computer-readable non-transitory storage medium of claim 10, wherein the database source comprises one or more dictionaries, each of the one or more dictionaries having a weight indicating whether the dictionary comprises words that are less commonly used to create passwords.

* * * * *